(12) United States Patent
Bunderson et al.

(10) Patent No.: US 11,932,585 B2
(45) Date of Patent: Mar. 19, 2024

(54) BLENDED NANOPARTICLE FERTILIZER DELIVERY

(71) Applicant: Aqua Yield Operations LLC, Draper, UT (US)

(72) Inventors: Landon D. Bunderson, Springville, UT (US); Britney Leigh Hunter, Salt Lake City, UT (US)

(73) Assignee: AQUA YIELD OPERATIONS LLC, Draper, UT (US)

( * ) Notice: Subject to any disclaimer, the term of this patent is extended or adjusted under 35 U.S.C. 154(b) by 421 days.

(21) Appl. No.: 16/844,881

(22) Filed: Apr. 9, 2020

(65) Prior Publication Data

US 2020/0325082 A1    Oct. 15, 2020

Related U.S. Application Data

(60) Provisional application No. 62/833,329, filed on Apr. 12, 2019.

(51) Int. Cl.
| | |
|---|---|
| *C05G 1/00* | (2006.01) |
| *A01C 21/00* | (2006.01) |
| *A01C 23/00* | (2006.01) |
| *C05C 11/00* | (2006.01) |
| *C05G 5/10* | (2020.01) |
| *C05G 5/27* | (2020.01) |

(52) U.S. Cl.
CPC ............... *C05G 1/00* (2013.01); *A01C 21/00* (2013.01); *A01C 23/00* (2013.01); *C05C 11/00* (2013.01); *C05G 5/10* (2020.02); *C05G 5/27* (2020.02)

(58) Field of Classification Search
CPC .... C05G 1/00; C05G 5/10; C05G 5/27; A01C 21/00; A01C 23/00; C05C 11/00
See application file for complete search history.

(56) References Cited

U.S. PATENT DOCUMENTS

| | | | |
|---|---|---|---|
| 5,527,524 A | 6/1996 | Tomalia et al. | |
| 9,883,670 B2 | 2/2018 | Niedermeyer | |
| 2006/0154069 A1 | 7/2006 | Lin et al. | |
| 2007/0178135 A1* | 8/2007 | Zhong | A61L 31/10 |
| | | | 977/754 |
| 2010/0029477 A1 | 2/2010 | McLaughlin et al. | |
| 2011/0253643 A1* | 10/2011 | Polshettiwar | B01J 23/38 |
| | | | 977/773 |
| 2013/0133386 A1 | 5/2013 | Baker et al. | |

(Continued)

FOREIGN PATENT DOCUMENTS

| | | |
|---|---|---|
| BG | 64816 | 5/2006 |
| CN | 110663506 | 1/2020 |

(Continued)

OTHER PUBLICATIONS

Tolaymat, Thabet, et al. "The effects of metallic engineered nanoparticles upon plant systems: an analytic examination of scientific evidence." Science of The Total Environment 579 (2017): 93-106. (Year: 2017).*

(Continued)

*Primary Examiner* — Jennifer A Smith
(74) *Attorney, Agent, or Firm* — Ray Quinney & Nebeker P.C.; John O. Carpenter

(57) ABSTRACT

An agricultural formulation for conveying nutrients to a plant includes dendrimer nanoparticles, spherical nanoparticles, and an active ingredient.

14 Claims, 4 Drawing Sheets

(56) References Cited

U.S. PATENT DOCUMENTS

| | | |
|---|---|---|
| 2015/0342189 A1 | 12/2015 | Ding et al. |
| 2015/0366186 A1 | 12/2015 | Li et al. |
| 2018/0169009 A1 | 6/2018 | Johnson et al. |

FOREIGN PATENT DOCUMENTS

| | | |
|---|---|---|
| EP | 2940080 | 2/2010 |
| WO | WO2019038642 | 2/2019 |

OTHER PUBLICATIONS

Hendrickson, C., G. Huffstutler, and L. Bunderson. "Emerging applications and future roles of nanotechnologies in agriculture." Agric Res Technol 11.1 (2017). (Year: 2017).*

Aqua-Yield. "NanoN+" Sell Sheet (Mar. 20, 2023). (Year: 2023).*

International Search Report and Written Opinion for PCT/US2020/012210; dated Mar. 24, 2020, 8 pages.

International Search Report and Written Opinion for PCT/US2020/027727; dated Jun. 18, 2020, 14 pages.

PUBCHEM. PAMAM dendrimer, ethylenediamine core, generation 0.0 solution; Sep. 13, 2005; pp. 1-16[online], retrieved on May 27, 2020; retrieved from https://pubchem.ncbi.nlm.nih.gov/compound/4140276.

\* cited by examiner

BLENDED NANOPARTICLE FERTILIZER DELIVERY

CROSS-REFERENCE TO RELATED APPLICATIONS

This application claims priority to and the benefit of U.S. Provisional Patent Application No. 62/833,329, filed on Apr. 12, 2019, which is hereby incorporated by reference in its entirety.

BACKGROUND OF THE DISCLOSURE

Agricultural fertilizers or other agents are delivered to plants in a variety of methods. The fertilizer is delivered either to the root structure of the plant or through the leaves of the plant where the fertilizer is taken up through pores in the leaves—including cuticular cracks/pores. Additionally, the fertilizer is applied to the soil or leaves in a dry form or mixed in a fluid medium to suspend the fertilizer and mobilize the fertilizer.

Conventionally, the fluid application of the fertilizer or other agent can allow for more even and controlled application, as well as more rapid uptake of the fertilizer or other agent. Foliar application (application of a fertilizer to the leaves of the plant) can provide a more direct application of the fertilizer to the plant.

SUMMARY

In some embodiments, an agricultural formulation for conveying an agrochemical to a plant includes spherical nanoparticles, dendrimer nanoparticles, and an active ingredient.

In some embodiments, an agricultural fertilizer formulation includes a liquid medium, a fertilizer active ingredient, spherical nanoparticles, and dendrimer nanoparticles. The liquid medium and fertilizer active ingredient define a total volume. A dendrimer volume ratio of the dendrimer nanoparticles to the total volume of the liquid medium and fertilizer active ingredient is at least 1 parts per billion, and a spherical volume ratio of the spherical nanoparticles to the total volume of the liquid medium and fertilizer active ingredient is at least 1 parts per billion.

In some embodiments, a method of administering a fertilizer to a plant includes providing a fluid fertilizer mixture including fertilizer and a liquid medium having a volume ratio between 1:160 and 1:32,000, adding dendrimer nanoparticles to the fluid fertilizer mixture to create a formulation where the dendrimer mass to fertilizer volume ratio is between 1 parts per million and 6 parts per million, adding spherical nanoparticles to the fluid fertilizer mixture to create a formulation where the spherical nanoparticle mass to fertilizer volume ratio is between 1 parts per million and 6 parts per million and applying the formulation to the plant.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 3-1 is a side view of a solid spherical nanoparticle, according to at least one embodiment of the present disclosure;

FIG. 3-2 is a cross-sectional view of a mesoporous hollow spherical nanoparticle, according to at least one embodiment of the present disclosure;

DETAILED DESCRIPTION

Figure 1:
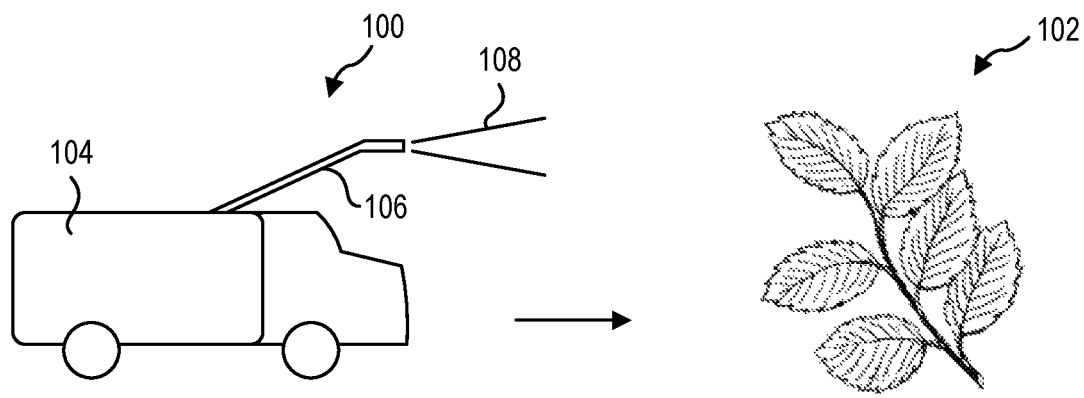
FIG. 1 is a schematic representation of foliar application of a fertilizer formulation from a spray truck to the leaves of a plant, according to at least one embodiment of the present disclosure.

This disclosure generally relates to devices, systems, and methods for increasing the uptake of agrochemicals in a plant. More particularly, the present disclosure relates to systems, mixtures, and methods for increasing the efficiency of foliar of a fertilizer or pesticide application to a plant using a supplementary nanoparticle blend. In at least one embodiment of the present disclosure, a mixture of active ingredient with a nanoparticle blend containing dendrimer nanoparticles and spherical nanoparticles is applied to a plant. In some examples, the dendrimer nanoparticles are Poly(amidoamine) (PAMAM) dendrimers. In other examples, the dendrimer nanoparticles are poly(etherhydroxylamine) (PEHAM) dendrimers. In yet other examples, the spherical nanoparticles are mesoporous hollow spherical nanoparticles. In further examples, the spherical nanoparticles are solid spherical nanoparticles. In at least one example, the mixture of fertilizer and nanoparticle blend is applied to the leaves of a plant. Nanoparticle supplements in a fertilizer mixture have been shown to increase fertilizer uptake. However, the same or greater proportion of applied fertilizer is taken up by the leaves of a plant with a lower quantity of nanoparticle supplement when the nanoparticle supplement includes a combination of nanoparticle types.

Nanoparticle supplements have also been shown to increase pesticide uptake. As used herein, a pesticide should be understood to include any active ingredient that adversely affects, harms, or kills an unwanted organism. For example, a pesticide is any active ingredient that weakens, sterilizes, incapacitates, desiccates, or kills an organism. Pesticides may include an insecticide, fungicide, herbicide, bactericide, or other agent that adversely affects an organism that may compete with or harm the crop plant. For example, nanoparticle supplements may increase the uptake rate of a herbicide by a weed, resulting in more efficient reduction of the weeds in the crop field.

Foliar feeding is the direct application of a mixture including a fertilizer or other agricultural agent directly to the leaves of a plant. Plants are able to absorb at least portions of the mixture through the stomata and the epidermis of the leaves. In some cases, the transport to nutrients may be faster through the stomata, but the overall absorption through the epidermis may result in a greater volume of nutrients absorbed. The different transport rates of the different parts of the leaf may result in a broader absorption curve of the nutrients as an initial dosage is received through the stomata and longer duration absorption occurs through the epidermis.

Foliar fertilization has been shown to produce a faster response than soil-based fertilization, as the fertilizer is absorbed directly into the leaves. Additionally, soil-based application can result in a leaching-out of the soil. For example, phosphorus applied to the soil can become fixed in a form that is inaccessible to the plant, thereby limiting the overall proportion of the nutrient taken up by the plant. In contrast, the fertilizers and other agents (collectively agrochemicals) applied to the leaves of a plant will not interact with other materials or other organisms in the soil.

However, there is a chance that the agrochemicals applied to the leaves are not absorbed. In some cases, the agrochemicals are shed from the leaves. In other cases, the agrochemicals simply dry on the leaves and are not absorbed. Availability of the fertilizer or other agents can include tailoring of the mixture to the plant, the environment, and the delivery mechanism. For example, proper adjustment of the mixture and the system can improve biological efficacy with a lower application rate and/or amount, as well as a lower impact on the environment and lower cost. Some factors in determining the mixture and application systems include even distribution of the agrochemical over the surface of the plant, safety of the mixture and application for workers and equipment, ease of preparation, performance, and environmental effect.

In other examples, the agrochemicals can be applied to the soil, with quantities adjusted for the portion of the mixture that remains in the soil. In soil soak applications, the uptake of the agrochemicals can still benefit from a supplement that encourages the absorption of the agrochemicals into the plant, for many of the same reasons as described above in relation to foliar application. For example, while a foliar application can be directed to the leaves of a specific plant, a soil application is a more general application. A nanoparticle supplement can, therefore, improve the reliability of the nutrient uptake by the plant for a given application of the agrochemical.

Soil or foliar application can be advantageous from a time, money, and resources standpoint. For example, the agrochemicals are applied to the plant in a liquid medium. The preferred liquid medium is water for many agrochemicals. Water may be desirable as a fluid medium for the agrochemicals because water has limited environmental effects and limited safety concerns relative to other options. Additionally, many crop plants require supplemental watering, and application of agrochemicals during watering can save time, resources, and money. While examples will be described herein in relation to foliar application and soil applications, it should be understood that any of the methods, compositions, or systems described herein may be equally applicable to various application modes.

Various agrochemical formulations can be used for different purposes and different applications. Formulations include an active ingredient and other ingredients such as surfactants, carriers, excipients, or other functional ingredients. For example, the present application will primarily refer to the use of fertilizer with dendrimers as a carrier, however, additional ingredients may be used. For example, a fertilizer mixed with dendrimers in water may have a greater transport rate than the same fertilizer mixed in water. However, a foliar application of either combination may not sufficiently adhere to the leaves of a plant to provide enough time for the leaves to absorb the active ingredient. In such examples, an additional ingredient may increase the surface tension of the fluid. In other examples, a surfactant may be included to decrease the surface tension.

In some embodiments, PAMAM dendrimers have an amine terminal group. The amine group has additional nitrogen atoms that are covalently bonded. As most plants are able to sever the nitrogen-bonds in the amine group, the PAMAM dendrimers are able to additionally deliver usable nitrogen to the plants, in addition to the active ingredients mobilized by the dendrimers in the formulation.

FIG. 1 is a schematic representation of foliar application of an agrochemical. A delivery system 100 is used to apply a fluid to the leaves 102 of the plant. In some embodiments, the delivery system 100 is a mobile system, such as a backpack, truck, tractor, trailer, sprayer (boom or row-crop sprayer), or other agricultural machinery that may be loaded with a holding tank 104 and driven to the delivery location. In other embodiments, the delivery system 100 is a stationary system. For example, the delivery system 100 can include a drip irrigation system, such as one using micro spray heads to atomize the formulation. In other examples, the delivery system 100 can include a sprinkler system or a center pivot irrigation system that sprays a liquid formulation onto the surface of the leaves 102.

In some embodiments, the formulation includes an active ingredient (such as fertilizer or pesticide) and a liquid medium in a volume ratio having an upper value, a lower value, or upper and lower values including any of 1:160; 1:320; 1:1,600; 1:3,200; 1:16,000, 1:32,000, or any values therebetween. For example, the volume ratio may be greater than 1:160. In other examples, the volume ratio may be less than 1:32,000. In yet other examples, the volume ratio may be between 1:160 and 1:32,000. In further examples, the volume ratio may be between 1:320 and 1:16,000.

In a particular example, the delivery system 100 includes a sprayer vehicle with a holding tank 104 and a boom 106. In such examples, the boom 106 is directed toward the leaves 102 of the plant and a spray 108 of the formulation is delivered to the leaves 102. In some cases, the formulation may be internally agitated in the holding tank 104 to limit and/or prevent aggregation of the agents in the formulation. In other cases, the formulation may experience external agitation of the movement of the holding tank 104 only, with no further internal agitation. In yet other examples, such as a stationary delivery system, the holding tank may be substantially still with no internal or external agitation.

Nanoparticles, as described herein, are particles having a particle diameter between 1 and 1000 nanometers (nm). Nanoparticles tend to have strong surface interactions and aggregate with one another and other particles. Dendrimers, in particular, have a strong tendency to aggregate.

Applications of dendrimers conventionally involve conjugating other chemicals to the dendrimer surface that can function as detecting agents (such as a dye molecule), affinity ligands, targeting components, radioligands, imaging agents, or pharmaceutically active compounds. Dendrimers have very strong potential for these applications because their structure can lead to multivalent systems. For example, one dendrimer molecule can have hundreds of possible sites to couple to an active ingredient or chemical agent, depending on the number of generations of branching layers in the dendrimer.

Figure 2:
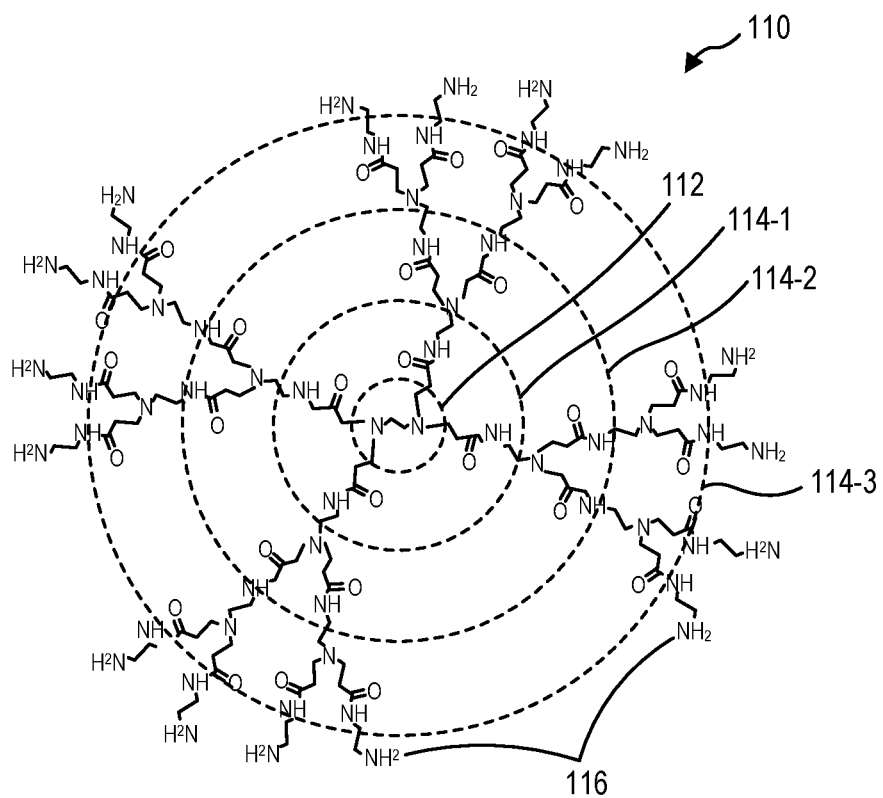
FIG. 2 is an illustration of the chemical structure of a PAMAM dendrimer, according to at least one embodiment of the present disclosure.

Dendrimers are conventionally used for drug delivery applications due to their monodispersity, water solubility, encapsulation ability, and large number of active terminal groups. FIG. 2 is a structural diagram of an example PAMAM dendrimer 110. The PAMAM dendrimer 110 has a core 112. In some examples, the core 112 is a diamine, such as ethylenediamine, that is the basis from which branching layers 114-1, 114-2, 114-3 or shells or generations are attached. For example, a third generation (3G) dendrimer has three branching layers 114-1, 114-2, 114-3. While the branching layers 114-1, 114-2, 114-3 of the embodiment illustrated in FIG. 2 repeat, the branching layers 114-1, 114-2, 114-3 are synthesized sequentially, allowing for different structures in the individual branching layers 114-1, 114-2, 114-3 if desired.

The branching layers 114-1, 114-2, 114-3 introduce additional terminal sites at each layer, increasing the ultimate number of terminal groups 116 possible with each successive layer. For example, the core 112 has four terminal sites, to which the first branching layer 114-1 is connected. The first branching layer 114-1 then doubles the number of terminal sites. The second branching layer 114-2 and third branching layer 114-3 each double the number, as well. In other embodiments, the branching layers 114-1, 114-2, 114-3 have other multiplicities that change the number of active terminal sites to which the successive generation bonds. For example, each of the branching layers 114-1, 114-2, 114-3 of the embodiment illustrated in FIG. 2 has a multiplicity of 2, resulting in 16 terminal groups 116 in the third branching layer. In another example with the same core 112 where each of the branching layers 114-1, 114-2, 114-3 has a multiplicity of three, the third generation would allow for 48 terminal groups 116.

In some embodiments, the PAMAM dendrimers used to deliver fertilizer and provide supplemental nitrogen are at least one and a half generation (1.5 G) dendrimers. In other embodiments, the PAMAM dendrimers used to deliver fertilizer and provide supplemental nitrogen are at least 2 G dendrimers. In yet other embodiments, the PAMAM dendrimers used to deliver fertilizer and provide supplemental nitrogen are at least 2.5 G dendrimers. In still other embodiments, the PAMAM dendrimers used to deliver fertilizer and provide supplemental nitrogen are at least 3 G dendrimers. In further embodiments, the PAMAM dendrimers used to deliver fertilizer and provide supplemental nitrogen are at least 3.5 G dendrimers.

Figures 1, 3:
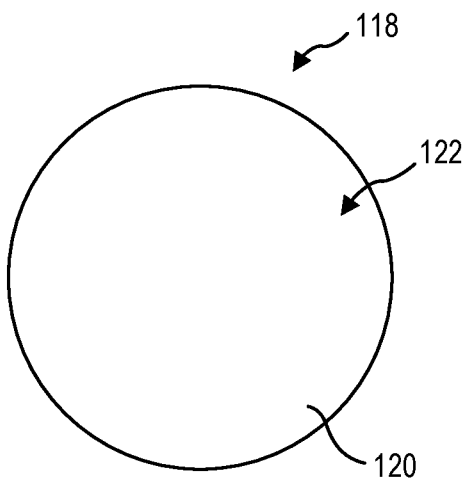
Figures 2, 3:
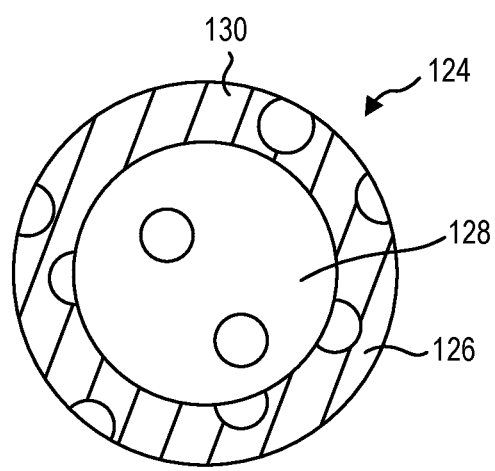

FIG. 3-1 and FIG. 3-2 illustrate embodiments of another type of nanoparticle that is blended with dendrimer nanoparticles to create a nanoparticle supplement according to the present disclosure. A spherical nanoparticle may be substantially solid or hollow. In some embodiments, a spherical nanoparticle may be nonporous. In other embodiments, the spherical nanoparticle can be mesoporous with one or more recess or cavity in an outer surface (or inner surface of a hollow particle) that may receive and carry an active ingredient. A nanoparticle is considered spherical if the major and minor axes (i.e., longitudinal and transverse) or if the orthogonal axes (x-, y-, and z-axes) of the particle have an aspect ratio of less than 2:1. For example, a completely spherical nanoparticle has a 1:1 aspect ratio of all orthogonal axes. A spherical nanoparticle may exhibit some elongation (such as up to a 2:1 ratio of the major axis relative to the minor axis or a 2:2:1 ratio of the orthogonal axes) and still be considered spherical, in contrast to the dendrimer nanoparticles or other needle-like or fibrous nanoparticles.

FIG. 3-1 is a side view of a nonporous solid spherical nanoparticle 118. The solid spherical nanoparticle 118 has a body 120 that includes a body material. The body material can be or include any material suitable for reacting with or carrying the active ingredient. For example, the body material can include a metal, metal alloy, metalloid, non-metal, ceramic, polymer, or other material that exhibits desired properties. Such properties may include hydrophilia, hydrophobia, a net negative charge, a net positive charge, polar reaction sites, non-polar reaction sites, or other properties. For example, the body material can include hydrophobic silicone (Si—Si). In other examples, the body material can include nonbiodegradable silica (Si—O—Si). In yet other examples, the body material can include hydrophilic biodegradable silica (Si—O—Si—S—S—Si—O—Si).

In some embodiments, the body 120 of the solid spherical nanoparticle 118 may be continuous and/or homogenous throughout the body 120. In other examples, the body material is a coating 122 that forms the outer surface of the body 120. A core within the body 120 and underlying the coating 122 may include a core material that is different from the body material 120 exposed to the medium and/or the active ingredients. For example, the core may be a metallic particle with a non-metal coating 122 allowing a nonbiodegradable silica body material to be positioned overlying a metal core. In other examples, the core material may be etched, eroded, or otherwise removed from the coating 122 to produce a hollow spherical nanoparticle.

FIG. 3-2 is a cross-sectional view of an embodiment of a mesoporous hollow spherical nanoparticle 124. While illustrated in FIG. 3-2 as mesoporous, the hollow spherical nanoparticle 124 may be nonporous in other embodiments. The hollow spherical nanoparticle 124 has a shell 126 that defines a cavity 128 therein. The shell 126 can have varying thicknesses relative to a diameter of the cavity 128 depending on the active ingredient or, in the case of a biodegradable body material, the desired duration of the hollow spherical nanoparticle 124 persisting after mixture and/or delivery.

The mesoporous hollow spherical nanoparticle 124 has a plurality of pores 130 or other recesses in the surface of the shell 126. The pores 130 can increase the loading of the hollow spherical nanoparticle 124 with an active ingredient to increase the uptake of the active ingredient into a plant. For example, a nonporous solid spherical nanoparticle, such as described in relation to FIG. 3-1, may yield a lower transport rate for an active ingredient than a mesoporous solid spherical nanoparticle. In another example, a solid spherical nanoparticle may yield a lower transport rate than a hollow spherical nanoparticle 124. In yet another example, a mesoporous spherical nanoparticle may yield a lower transport rate than a mesoporous hollow spherical nanoparticle 124. In at least one example, a dendrimer nanoparticle may yield a greater transport rate than a spherical nanoparticle.

Providing a nanoparticle supplement having a blend of spherical and dendrimer nanoparticles can provide transport rates that include both the rapid delivery provided by the dendrimer nanoparticles and the longer lasting delivery of the spherical nanoparticles while providing the increased delivery efficiency observed from using a nanoparticle supplement. Testing has confirmed, however, that a blend of spherical and dendrimer nanoparticles can increase transport efficiency over a conventional application of agrochemicals and/or provide equivalent transport efficiency to an agrochemical mixture with a nanoparticle supplement with a much smaller concentration of nanoparticles. For example, FIG. 4 illustrates and example of a variety of agrochemical mixtures applied to ryegrass using a 15-5-15 fertilizer composition.

Fertilizers carry an industry shorthand for the three most common nutrients provided to the plant. The format for the shorthand is generally N-P-K, where the letters are the atomic symbol for the nutrient. For example, a general-purpose fertilizer with a 10-10-10 designation contains 10% by weight of each of a nitrogen-supplying compound, a phosphorus-supplying compound, and a potassium-supplying compound. The remaining composition of the fertilizer is inert ingredients in the formulation. The nutrient-supplying compounds can have net negative or positive charges.

In the ryegrass study, the dry clipping weights of the ryegrass grown with agrochemical mixtures including a nanoparticle supplement are compared to a control mixture 238 containing only the fertilizer composition in a liquid medium. The first bar is the dry clipping weights of the ryegrass grown with an agrochemical mixture including the 15-5-15 fertilizer composition and a dendrimer nanoparticle supplement mixture 232. The fertilizer and dendrimer nanoparticle supplement mixture 232 includes the dendrimer nanoparticle supplement in a standard concentration that has been used by the inventors previously. The second through fifth bars of the graph illustrate varying concentrations relative to the standard concentration.

For example, the second bar reflects the dry clipping weights of the ryegrass grown with a second agrochemical mixture. The second mixture is a fertilizer composition and a nanoparticle supplement including the dendrimer nanoparticle at the standard concentration (i.e., the same concentration as the fertilizer and dendrimer nanoparticle supplement mixture 232 of the first bar) as well as a solid spherical nanoparticle in the same standard concentration. The fertilizer and dendrimer/spherical nanoparticle mixture 234 resulted in a similar, but reduced, total growth of the ryegrass compared to the fertilizer and dendrimer nanoparticle supplement mixture 232. The reduction is likely due to agglomeration or other saturation interaction of the dendrimer and spherical nanoparticles.

The third through fifth bars reflect dry clipping weights of the ryegrass grown with nanoparticle supplements including concentrations below the standard concentration used on the plat of the first bar. The first fertilizer and reduced dendrimer/spherical nanoparticle mixture 236-1 has a nanoparticle supplement in which both the dendrimer nanoparticles and the spherical nanoparticles are present in 50% of the standard concentration relative to the same 15-5-15 fertilizer composition. The reduction of the dendrimer nanoparticle concentration to 50% and the reduction of the spherical nanoparticle concentration to 50% produced a reduced efficiency in the fertilizer delivery. The ryegrass dry clipping weight was between the amount produced by the control mixture 238 and the standard fertilizer and dendrimer nanoparticle supplement mixture 232 of the first bar.

Reducing the dendrimer nanoparticle concentration further yielded increased ryegrass dry clipping weights relative to the first fertilizer and reduced dendrimer/spherical nanoparticle mixture 236-1 and the control mixture 238, as reflected by the fourth and fifth bars. The second fertilizer and reduced dendrimer/spherical nanoparticle mixture 236-2 and third fertilizer and reduced dendrimer/spherical nanoparticle mixture 236-3 produced substantially similar dry clipping weights to the standard fertilizer and dendrimer nanoparticle supplement mixture 232 while using the dendrimer nanoparticles in 20% of the standard concentration.

The second fertilizer and reduced dendrimer/spherical nanoparticle mixture 236-2 of the fourth bar is the fertilizer composition with a nanoparticle supplement including dendrimer nanoparticles at 20% of the standard concentration and spherical nanoparticles at 80% of the standard concentration. The third fertilizer and reduced dendrimer/spherical nanoparticle mixture 236-3 of the fourth bar is the fertilizer composition with a nanoparticle supplement including dendrimer nanoparticles at 20% of the standard concentration and spherical nanoparticles at 20% of the standard concentration.

The third fertilizer and reduced dendrimer/spherical nanoparticle mixture 236-2 demonstrates the benefits in growth to the ryegrass are approximately equivalent between the standard fertilizer and dendrimer nanoparticle supplement mixture 232 and the third fertilizer and reduced dendrimer/spherical nanoparticle mixture 236-3 using only 20% of the dendrimer concentration. The dendrimer concentration, therefore can be reduced by 80% by blending the dendrimer nanoparticles with spherical nanoparticles. There is little change when reducing the spherical nanoparticles to 20% from 80% of the standard concentration, as well, allowing the nanoparticle supplement to use only a total of 40% of the standard concentration.

FIG. 5 illustrates another example of agrochemical treatments applied to a plant. In this example, the growth is measured in the dry weight of wheat seedlings grown using two soil drenchings. The control mixture 338, including the conventional fertilizer composition with no nanoparticle supplement, is shown in the first bar on the graph. The second bar illustrates the dry weight of the seedlings after two soil drench applications of the fertilizer and hollow spherical nanoparticle mixture 340 with the standard concentration of the hollow spherical nanoparticle supplement in the mixture. The second bar reflects an increase in dry weight of the wheat seedlings that are grown with the fertilizer and hollow spherical nanoparticle mixture 340 over those grown with the control mixture 338.

The third bar illustrates the dry weight of the seedlings after two soil drench applications of the fertilizer and hollow spherical/dendrimer nanoparticle mixture 342 with the standard concentration of both the hollow spherical nanoparticles and the dendrimer nanoparticles in the mixture. The third bar reflects an increase in dry weight of the wheat seedlings that are grown with the fertilizer and hollow spherical/dendrimer nanoparticle mixture 342 over those grown with the control mixture 338. The third bar reflects a small decrease in dry weight of the wheat seedlings that are grown with the fertilizer and hollow spherical/dendrimer nanoparticle mixture 342 relative to those grown with the fertilizer and hollow spherical nanoparticle mixture 340 with the standard concentration of the hollow spherical nanoparticle. The nanoparticles interacting with one another can reduce the efficiency of the fertilizer transport in the plant.

Figure 5:
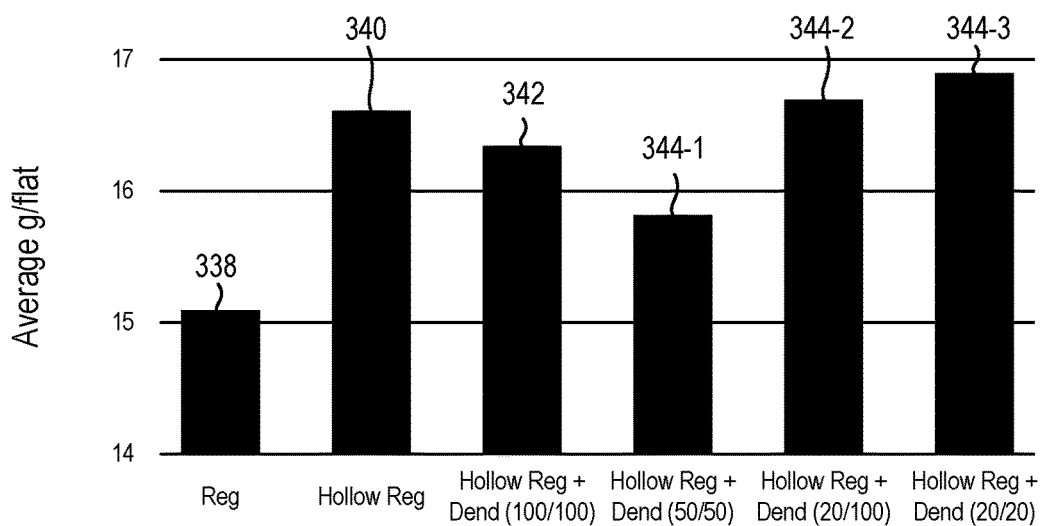
FIG. 5 is a graph illustrating the growth of wheat seedlings with a variety of agricultural formulations, according to at least one embodiment of the present disclosure.

The fourth bar in FIG. 5 illustrates the dry weight of the wheat seedlings after two soil drench applications of a first fertilizer and reduced hollow spherical/dendrimer nanoparticle mixture 344-1 with the 50% concentration of both the hollow spherical nanoparticles and the dendrimer nanoparticles in the mixture. The fourth bar reflects an increase in dry weight of the wheat seedlings that are grown with the first fertilizer and reduced hollow spherical/dendrimer nanoparticle mixture 344-1 over those grown with the control mixture 338. The fourth bar also reflects a decrease in dry weight of the wheat seedlings that are grown with the first fertilizer and reduced hollow spherical/dendrimer nanoparticle mixture 344-1 relative to those grown with the fertilizer and hollow spherical nanoparticle mixture 340 with the standard concentration of the hollow spherical nanoparticle. The nanoparticles interacting with one another can reduce the efficiency of the fertilizer transport in the plant and the overall reduction in nanoparticle quantity provides fewer free nanoparticles to assist in the transport of the fertilizer relative to the fertilizer and hollow spherical/dendrimer nanoparticle mixture 342.

Further reducing one or more of the nanoparticle concentrations can provide an increase in fertilizer transport efficiency. For example, the fifth and sixth bars of FIG. 5 illustrate a dry weight of the wheat seedlings after two soil drench applications of a second fertilizer and reduced hollow spherical/dendrimer nanoparticle mixture 344-2 and a third fertilizer and reduced hollow spherical/dendrimer nanoparticle mixture 344-3.

The second fertilizer and reduced hollow spherical/dendrimer nanoparticle mixture 344-2 has a nanoparticle supplement including hollow spherical nanoparticles at a 20% concentration relative to a standard concentration and dendrimer nanoparticles at the standard concentration. The fifth bar reflects an increase in dry weight of the wheat seedlings over those grown with the control mixture 338. The fifth bar also reflects an increase in dry weight of the wheat seedlings that are grown with the second fertilizer and reduced hollow spherical/dendrimer nanoparticle mixture 344-2 relative to those grown with the first fertilizer and reduced hollow spherical/dendrimer nanoparticle mixture 344-1. Reducing the hollow spherical nanoparticle concentration reduces the interaction between the spherical and dendrimer nanoparticles to assist in the transport of the fertilizer.

The third fertilizer and reduced hollow spherical/dendrimer nanoparticle mixture 344-3 has a nanoparticle supplement including hollow spherical nanoparticles and dendrimer nanoparticles at a 20% concentration relative to a standard concentration. The sixth bar reflects an increase in dry weight of the wheat seedlings over those grown with the control mixture 338. The sixth bar also reflects an increase in dry weight of the wheat seedlings that are grown with the third fertilizer and reduced hollow spherical/dendrimer nanoparticle mixture 344-3 relative to those grown with all other mixtures. Providing a blend of nanoparticle types can provide equivalent or even improved growth with a lower concentration of the nanoparticles, as shown in the third fertilizer and reduced hollow spherical/dendrimer nanoparticle mixture 344-3.

Figure 6:
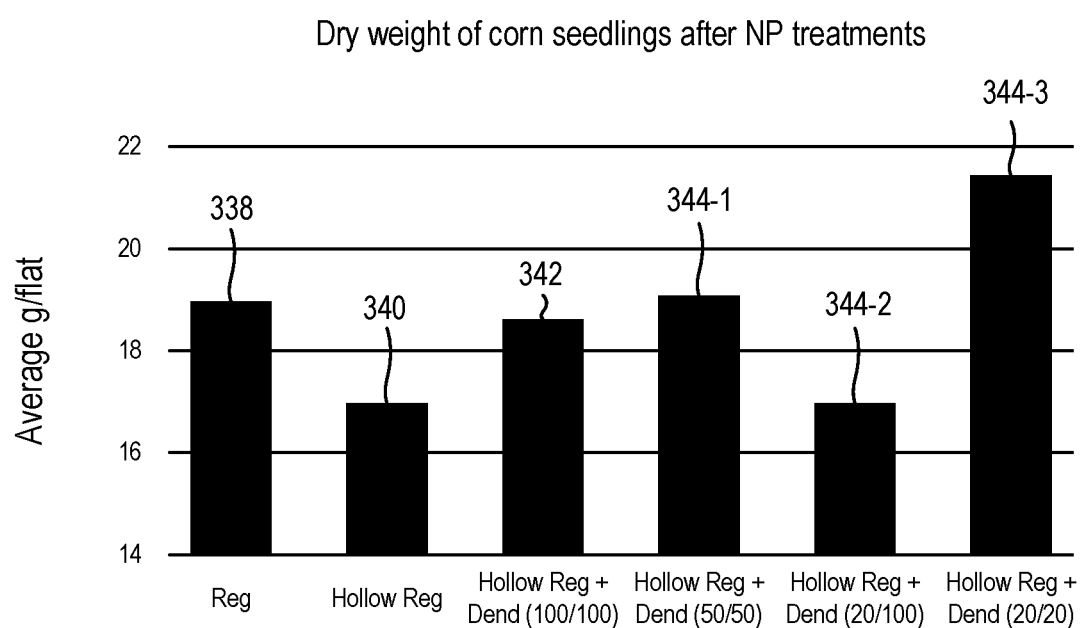
FIG. 6 is a graph illustrating the growth of corn seedlings with a variety of agricultural formulations, according to at least one embodiment of the present disclosure.

FIG. 6 shows another example trial of corn seedlings grown with soil drenchings of the same fertilizer mixtures used in the trial described in relation to FIG. 5. The first bar reflects the dry weight of the corn seedlings grown with a regular fertilizer mixture without nanoparticle supplement in the control mixture 338. The second bar illustrates the dry weight of the seedlings after two soil drench applications of the fertilizer and hollow spherical nanoparticle mixture 340 with the standard concentration of the hollow spherical nanoparticle supplement in the mixture. The second bar reflects a decrease in dry weight of the corn seedlings that are grown with the fertilizer and hollow spherical nanoparticle mixture 340 from those grown with the control mixture 338. Since fertilizers are received differently by different plants, the fertilizer and hollow spherical nanoparticle mixture 340 that produced an increase in the corn seedlings may not produce an increase in other plants, such as the corn seedlings of the trial in FIG. 6. However, relative to the fertilizer and hollow spherical nanoparticle mixture 340, the tested nanoparticle blends demonstrate increases in dry weights.

The third bar illustrates the dry weight of the corn seedlings after two soil drench applications of the fertilizer and hollow spherical/dendrimer nanoparticle mixture 342 with the standard concentration of both the hollow spherical nanoparticles and the dendrimer nanoparticles in the mixture. The third bar reflects a slight decrease in dry weight of the corn seedlings that are grown with the fertilizer and hollow spherical/dendrimer nanoparticle mixture 342 over those grown with the control mixture 338, but the third bar also reflects an increase in dry weight of the corn seedlings that are grown with the fertilizer and hollow spherical/dendrimer nanoparticle mixture 342 relative to those grown with the fertilizer and hollow spherical nanoparticle mixture 340 with the standard concentration of the hollow spherical nanoparticle. The presence of the dendrimers in the mixture improves transport of the nutrients to the corn seedlings.

The fourth bar in FIG. 6 illustrates the dry weight of the corn seedlings after two soil drench applications of a first fertilizer and reduced hollow spherical/dendrimer nanoparticle mixture 344-1 with the 50% concentration of both the hollow spherical nanoparticles and the dendrimer nanoparticles in the mixture. The fourth bar reflects approximately the same dry weight of the corn seedlings as those grown with the control mixture 338. The fourth bar also reflects an increase in dry weight of the corn seedlings relative to those grown with the fertilizer and hollow spherical nanoparticle mixture 340 with the standard concentration of the hollow spherical nanoparticle. The nanoparticles interacting with one another can reduce the efficiency of the fertilizer transport in the plant and the overall reduction in nanoparticle quantity provides fewer free nanoparticles to assist in the transport of the fertilizer relative to the fertilizer and hollow spherical/dendrimer nanoparticle mixture 342.

Further reducing one or more of the nanoparticle concentrations can change the delivery behavior. For example, the fifth and sixth bars of FIG. 5 illustrate a dry weight of the corn seedlings after two soil drench applications of a second fertilizer and reduced hollow spherical/dendrimer nanoparticle mixture 344-2 and a third fertilizer and reduced hollow spherical/dendrimer nanoparticle mixture 344-3. The second fertilizer and reduced hollow spherical/dendrimer nanoparticle mixture 344-2 produced a reduced dry weight of the corn seedlings, while the third fertilizer and reduced hollow spherical/dendrimer nanoparticle mixture 344-3 increased the dry weight of the corn seedlings grown.

The second fertilizer and reduced hollow spherical/dendrimer nanoparticle mixture 344-2 has a nanoparticle supplement including hollow spherical nanoparticles at a 20% concentration relative to a standard concentration and dendrimer nanoparticles at the standard concentration.

The third fertilizer and reduced hollow spherical/dendrimer nanoparticle mixture 344-3 has a nanoparticle supplement including hollow spherical nanoparticles and dendrimer nanoparticles at a 20% concentration relative to a standard concentration. The sixth bar reflects an increase in dry weight of the wheat seedlings over those grown with any other mixture. While the transport changes differently for different plants, providing a blend of nanoparticle types can provide equivalent or even improved growth with a lower concentration of the nanoparticles and more consistently, saving time customizing a nanoparticle supplement for each plant.

Figure 4:
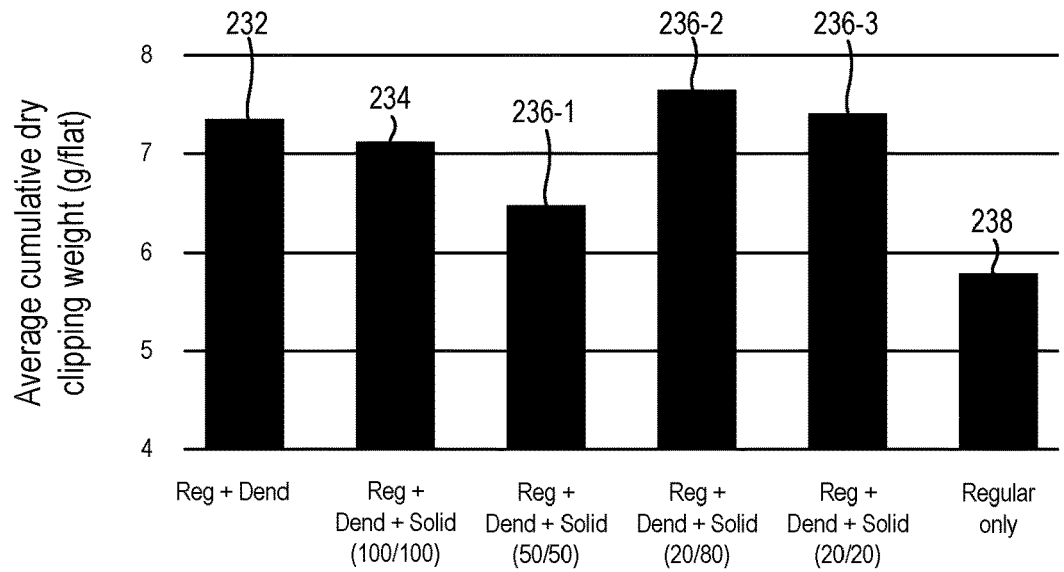
FIG. 4 is a graph illustrating the growth of ryegrass with a variety of agricultural formulations, according to at least one embodiment of the present disclosure.

In each trail described in relation to FIG. 4 through FIG. 6, the highest dry weight of the plants after application of the fertilizer and nanoparticle supplement was associated with the lower concentrations of dendrimers in combination with a spherical nanoparticle. For example, in each instance of applications to a trail flat of plants, the different combinations of types and concentrations of nanoparticles in the supplement had varying effects. However, in each instance, the 20% concentration of dendrimers provided the largest performance increase in the growth of the plants. Reduction of the mass of dendrimer and of total nanoparticles in an agricultural formulation allows for larger batches of the formulation to be mixed in larger tanks. The cost savings and material savings can provide more efficient fertilization and irrigation of plants.

In some embodiments, a mass to volume ratio of the nanoparticle supplement to the volume of the fertilizer active ingredient is in a range having an upper value, a lower value, or upper and lower values including any of 1 part per million (ppm), 2 ppm, 3 ppm, 4 ppm, 5 ppm, 6 ppm, 7 ppm, 8 ppm, 9 ppm, 10 ppm, or any values therebetween. For example, the mass to volume ratio of the nanoparticle supplement to the volume of the fertilizer active ingredient may be greater than 1 ppm. In other examples, the mass to volume ratio of the nanoparticle supplement to the volume of the fertilizer active ingredient may be less than 10 ppm. In further examples, the mass to volume ratio of the nanoparticle supplement to the volume of the fertilizer active ingredient may be between 1 ppm and 10 ppm. In at least one example, the mass to volume ratio of the nanoparticle supplement to the volume of the fertilizer active ingredient is less than 6 ppm.

In some embodiments, a mass to volume ratio of the dendrimer portion of the nanoparticle supplement to the volume of the fertilizer active ingredient is in a range having an upper value, a lower value, or upper and lower values including any of 1 part per million (ppm), 2 ppm, 3 ppm, 4 ppm, 5 ppm, 6 ppm, or any values therebetween. For example, the mass to volume ratio of the dendrimer portion to the volume of the fertilizer active ingredient may be greater than 1 ppm. In other examples, the mass to volume ratio of the dendrimer portion to the volume of the fertilizer active ingredient may be less than 6 ppm. In further examples, the mass to volume ratio of the dendrimer portion to the volume of the fertilizer active ingredient may be between 1 ppm and 6 ppm. In at least one example, the mass to volume ratio of the dendrimer portion to the volume of the fertilizer active ingredient is less than 6 ppm.

In some embodiments, a mass to volume ratio of the spherical nanoparticle portion of the nanoparticle supplement to the volume of the fertilizer active ingredient is in a range having an upper value, a lower value, or upper and lower values including any of 1 part per million (ppm), 2 ppm, 3 ppm, 4 ppm, 5 ppm, 6 ppm, or any values therebetween. For example, the mass to volume ratio of the spherical nanoparticle portion to the volume of the fertilizer active ingredient may be greater than 1 ppm. In other examples, the mass to volume ratio of the spherical nanoparticle portion to the volume of the fertilizer active ingredient may be less than 6 ppm. In further examples, the mass to volume ratio of the spherical nanoparticle portion to the volume of the fertilizer active ingredient may be between 1 ppm and 6 ppm. In at least one example, the mass to volume ratio of the spherical nanoparticle portion to the volume of the fertilizer active ingredient is less than 6 ppm.

In some embodiments, a mass to volume ratio of the nanoparticle supplement to the total volume of the liquid medium and fertilizer active ingredient is in a range having an upper value, a lower value, or upper and lower values including any of 1 part per billion (ppb), 2 ppb, 4 ppb, 6 ppb, 8 ppb, 10 ppb, 12 ppb, 14 ppb, 16 ppb, 18 ppb, 20 ppb, or any values therebetween. For example, the mass to volume ratio of the nanoparticle supplement to the total volume of the liquid medium and fertilizer active ingredient may be greater than 1 ppb. In other examples, the mass to volume ratio of the nanoparticle supplement to the total volume of the liquid medium and fertilizer active ingredient may be less than 20 ppb. In further examples, the mass to volume ratio of the nanoparticle supplement to the total volume of the liquid medium and fertilizer active ingredient may be between 1 ppb and 20 ppb. In at least one example, the mass to volume ratio of the nanoparticle supplement to the total volume of the liquid medium and fertilizer active ingredient is less than 10 ppb.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A formulation for conveying nutrients to a plant, the formulation comprising:
   a nanoparticle supplement including:
      dendrimer nanoparticles, and
      hollow spherical nanoparticles; and
   an active ingredient, wherein at least a first portion of the active ingredient is coupled to the dendrimer nanoparticles and at least a second portion of the active ingredient is loaded in at least one pore of the spherical nanoparticles, and the active ingredient is configured to be conveyed to the plant by the dendrimer nanoparticles and the spherical nanoparticles.

2. The formulation of claim 1, the spherical nanoparticles being mesoporous nanoparticles.

3. The formulation of claim 1, the dendrimer nanoparticles being Poly(aminoamide) (PAMAM) dendrimers.

4. The formulation of claim 3, the PAMAM dendrimer having an amine terminal group.

5. The formulation of claim 1, further comprising a liquid medium.

6. The formulation of claim 5, the active ingredient and the liquid medium having a volume ratio between 1:160 and 1:32,000.

7. The formulation of claim 1, the nanoparticle supplement and the active ingredient having a mass to volume ratio of at least 1 parts per million (ppm).

8. The formulation of claim 1, the nanoparticle supplement having equal parts dendrimer nanoparticles and spherical nanoparticles.

9. The formulation of claim 1, the nanoparticle supplement further including solid spherical nanoparticles.

10. An agricultural fertilizer formulation, the formulation comprising:
    a liquid medium;
    a fertilizer active ingredient, where the liquid medium and fertilizer active ingredient have a total volume; and
    a nanoparticle supplement, a mass to volume ratio of the nanoparticle supplement to the total volume of the liquid medium and fertilizer active ingredient being at least 1 parts per billion (ppb), where the nanoparticle supplement includes:
       dendrimer nanoparticles, and
       hollow spherical nanoparticles, wherein at least a first portion of the active ingredient is coupled to the dendrimer nanoparticles and at least a second portion of the active ingredient is loaded in the spherical nanoparticles, and the active ingredient is configured to be conveyed to a plant by the dendrimer nanoparticles and the spherical nanoparticles.

11. The formulation of claim 10, the dendrimer nanoparticles being PAMAM dendrimers.

12. The formulation of claim 10, a ratio of a mass of the nanoparticle supplement to the total volume of the liquid medium and fertilizer active ingredient being no more than 20 ppb.

13. The formulation of claim 10, the nanoparticle supplement and fertilizer active ingredient having a mass to volume ratio of no more than 10 ppm.

14. The formulation of claim 10, the fertilizer active ingredient providing no nitrogen supplement.

* * * * *